April 18, 1944. A. KULLMAN ET AL 2,346,923
APPARATUS FOR FLAME HARDENING RACKS AND THE LIKE
Original Filed May 15, 1941 3 Sheets-Sheet 1
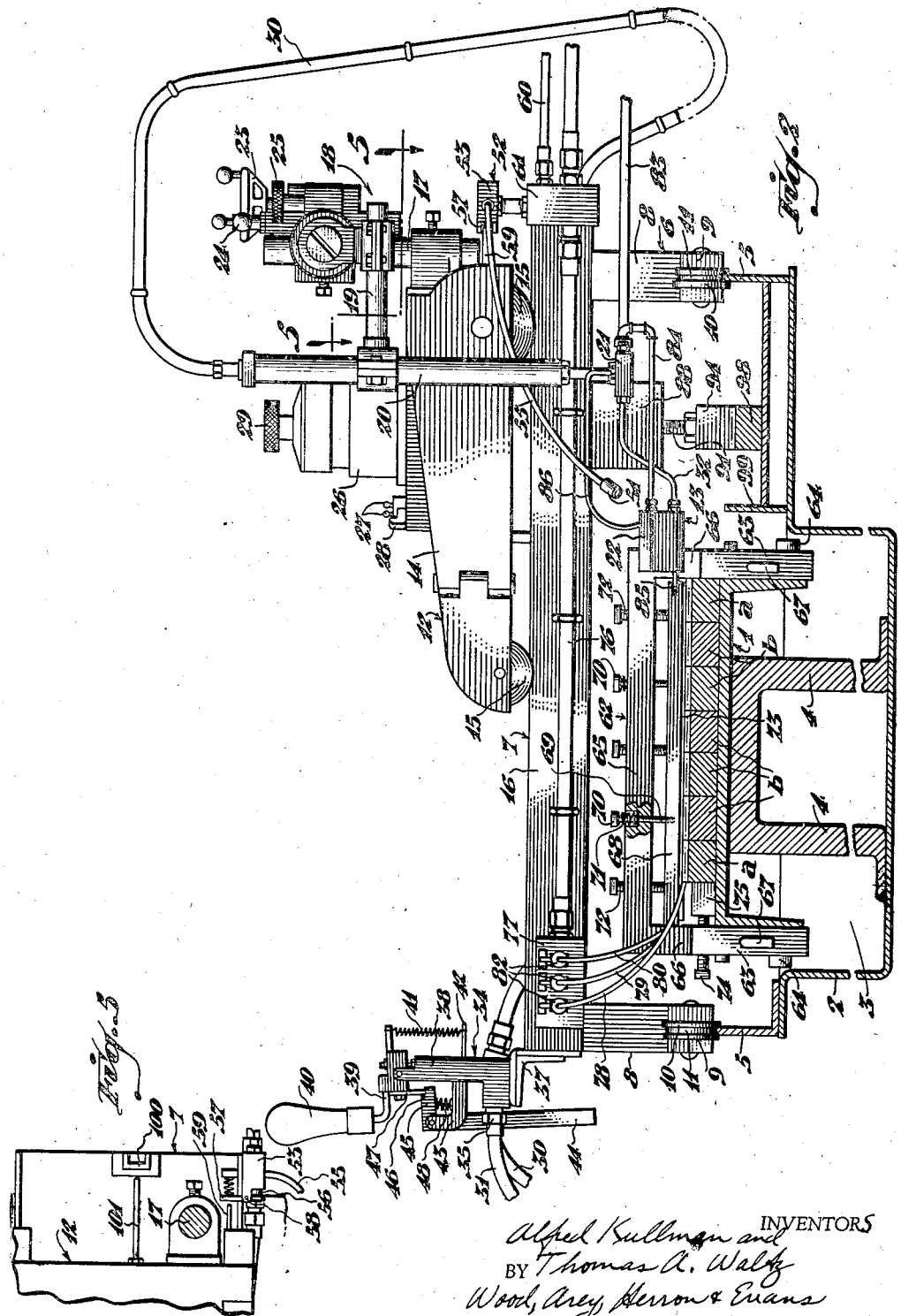
INVENTORS
Alfred Kullman and
BY Thomas A. Waltz
Wood, Arey, Herron & Evans
ATTORNEYS

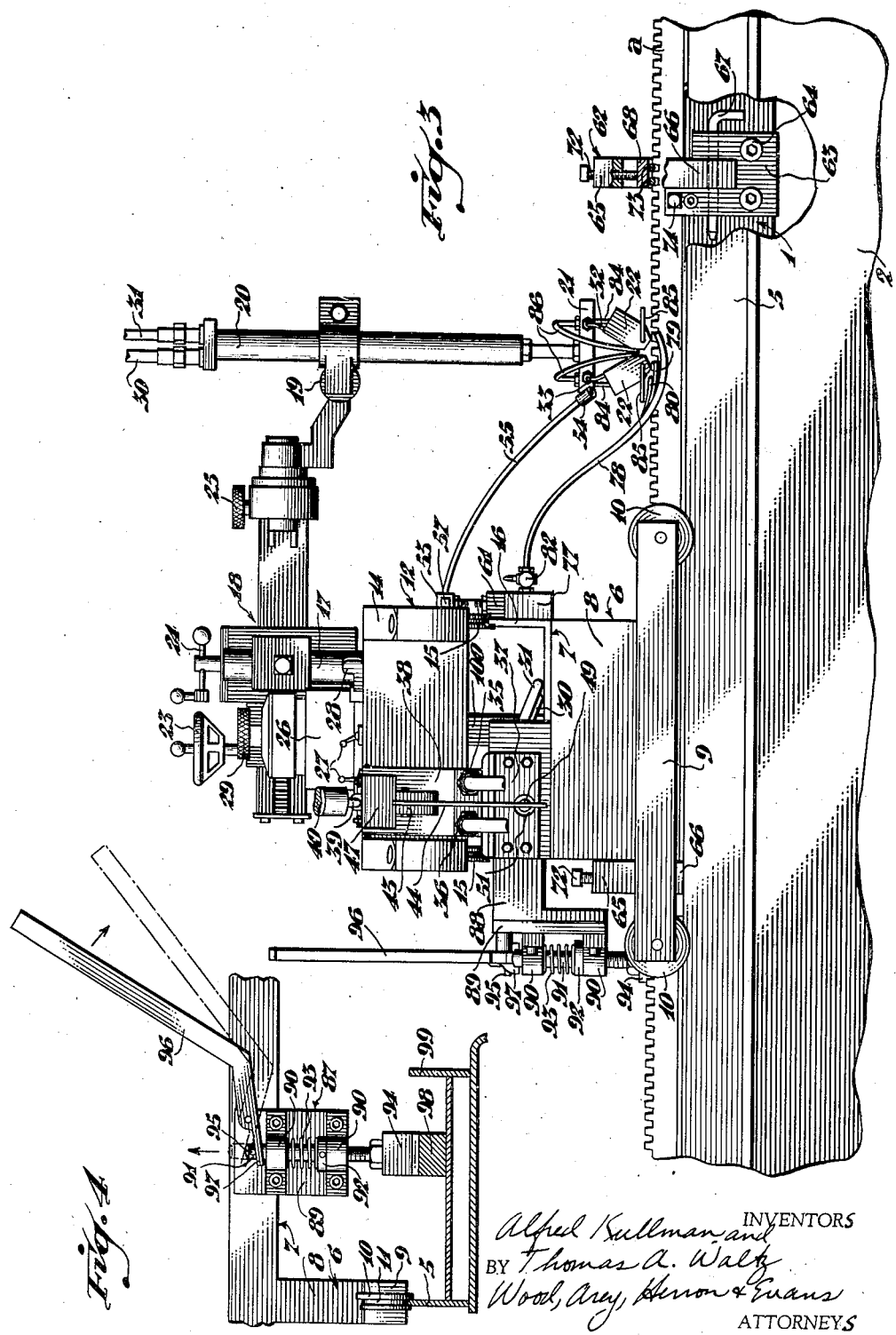

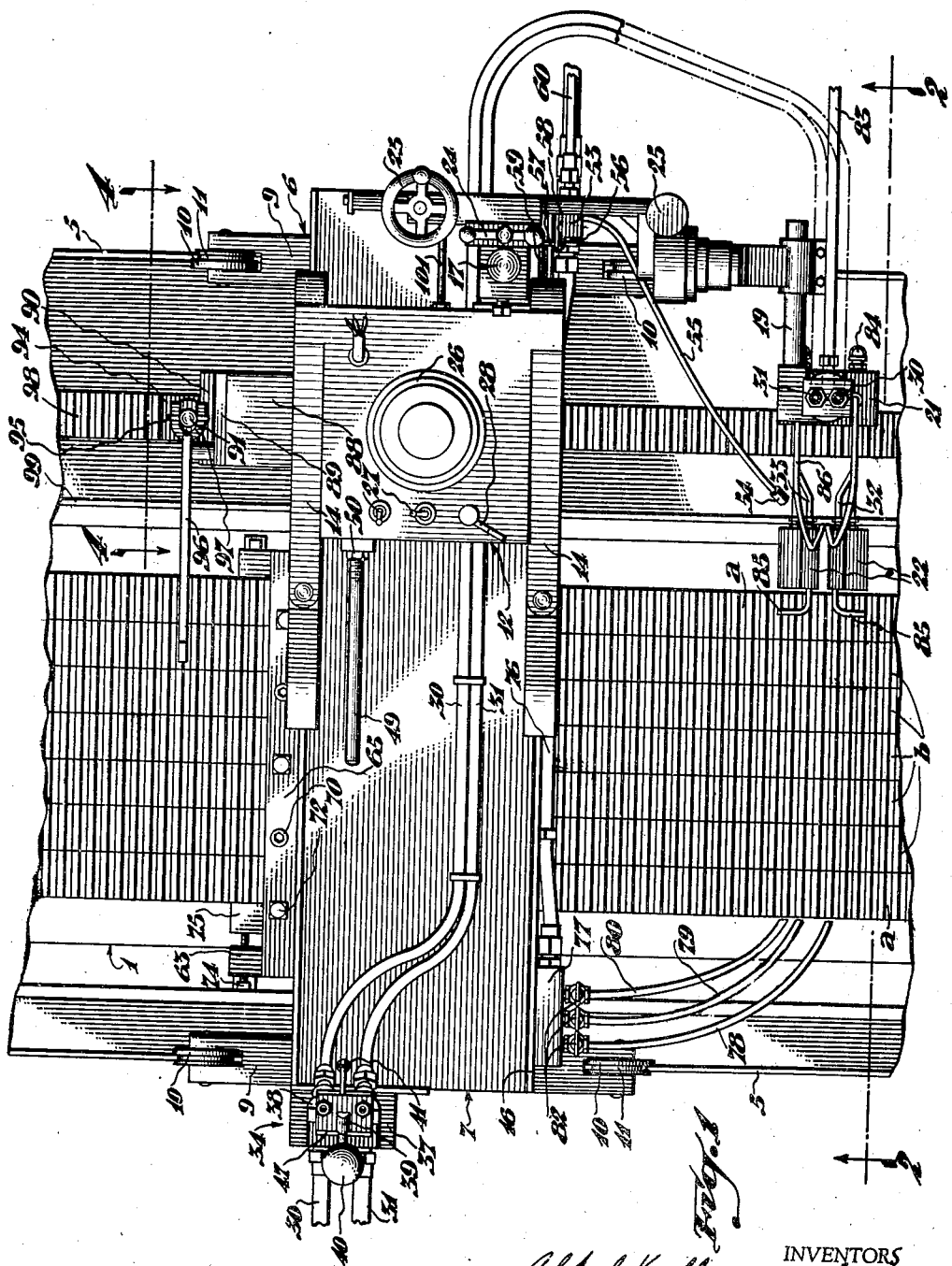

Patented Apr. 18, 1944

2,346,923

UNITED STATES PATENT OFFICE 2,346,923

APPARATUS FOR FLAME HARDENING RACKS AND THE LIKE

Alfred Kullman and Thomas A. Waltz, Cincinnati, Ohio, assignors to The American Tool Works Company, Cincinnati, Ohio, a corporation of Ohio Original application May 15, 1941, Serial No. 393,594. Divided and this application August 22, 1941, Serial No. 407,994

8 Claims. (Cl. 266—5)

This invention relates to the flame hardening of racks or rack bars for the purpose of hardening the teeth which constitute the rack so as to make them more capable of withstanding wear during usage. Racks of the type to which the invention is particularly applicable are those used on lathes and similar machine tools. In a lathe, for example, the rack is used as means for driving the carriage. This invention contemplates a method and apparatus by which the teeth of the racks may be hardened in order that the teeth may be wear resistant, capable of withstanding any abuse to which they may be subjected, so that more satisfactory performance is obtained from the tool or apparatus of which the rack bars form a part.

The rack bars used on many machine tools or other pieces of equipment, are quite long and of substantial width and thickness. In a lathe, for example, the rack extends substantially the entire length of the lathe bed and may be ten to fifteen feet long and one to two inches thick; sometimes, in very long machines, two such bars are joined, end to end. If such a bar is heated to a hardening temperature in its entirety, it is distorted and becomes either warped or twisted so badly that it cannot be used. However, it has been determined that the teeth of the bar can be heated to hardening temperature individually, then cooled and thus hardened, while adjacent portions of the bar are maintained in cool condition, without effecting any appreciable distortion of the bar or causing it to become twisted. This enables the original shape of the bar to be preserved, and yet the desirable hardness and wear resistance be imparted to the rack teeth.

It is conventional in the building of machine tools in which racks are used to drill pin or screw holes through the base portions of the racks, then clamp the racks upon the machine to which they are to be mounted, and then drill holes into the machine by using the rack holes previously drilled as guides; this procedure enables the holes in the machine to be aligned accurately with respect to the holes in the rack. Afterwards, some of the holes in both pieces usually are reamed for the reception of dowel or taper pins. If the base of the rack be hardened, then the holes in it cannot be reamed and special precautions need be taken to obtain the desired alignment. It has been determined that while the teeth of the rack bars can be hardened in accordance with the method of the present invention without distortion of the bars, the hardening operation readily can be confined to the tooth portions only, leaving the base in an unhardened condition and suitable to be drilled and reamed. Thus, the machineability of the base portion of the rack is preserved while the desired wear resistance is imparted to the teeth.

This feature is of particular importance in another respect. Sometimes it is desirable to use short lengths of rack joined end to end, and when this is the case it is necessary that the teeth at the endwise portion be "mated" for preservation of the tooth spacing at the juncture. If the short sections were hardened in their entirety, as some machine builders have done in the past, the metal can be removed to obtain the desired "mating" of the teeth only by a slow and tedious grinding operation. The rack bars made in accordance with the present invention can be cut into short lengths when desirable after the teeth have been hardened simply by means of an ordinary hack saw, and the end surfaces can then be milled to a smooth surface in much less the time than is required for grinding.

The principal object of the present invention has been to provide means for hardening the individual teeth by this technique in a manner which is quick and inexpensive.

A further object of the invention has been to provide for the hardening of a plurality of racks simultaneously.

Acetylene gas and oxygen are the mediums used to furnish the heat for the hardening operation; however, these gases are relatively expensive and, for their conservation, a further object of the invention has been to provide means for automatically cutting off the discharge of the gases during the periods when the flame provided by the gases is not being applied directly to the rack teeth.

A further object of the invention has been to provide a method for hardening rack teeth by means of an intense oxyacetylene flame in such a manner that the sharp corners of the teeth, and especially the corners at the tooth ends, are not burned or scorched by the flame.

A still further object of the invention has been to provide an apparatus arranged for hardening rack teeth one after another serially by means of a torch passing longitudinally of the teeth, that is across the rack bar, and to provide means for indexing the torch apparatus relative to the teeth so that each tooth is hardened uniformly throughout its length and uniformly with respect to the other teeth of the bar.

A still further object has been to provide a method for hardening the teeth of rack bars without hardening the base of the bars in order that the base portions may be drilled, reamed, and otherwise machined after the hardening operation is completed.

In order that the individual teeth of a plurality of bars may be hardened simultaneously, the invention also is directed to means for aligning the bars in a simple and convenient manner in order that each tooth of each bar will be subjected to the same degree of heat treatment.

Other objects of the invention and further advantages are disclosed in the detailed specification which follows. The drawings illustrate a preferred embodiment of apparatus adapted to the practice of the invention. This apparatus is particularly useful for hardening the teeth of long rack bars and the like, but it also may be used for short or sectional rack lengths. In the apparatus disclosed in the drawings, the rack bars which are to be hardened are held stationarily upon a table and the flame hardening apparatus is advanced serially along the teeth. It will be understood, however, that the invention contemplates the reverse procedure as to both method and machine, that is the stationary mounting of the torch apparatus and serial indexing of the rack teeth relative to it.

In the drawings:

Figure 1 is a plan view looking down upon the torch and carriage apparatus and the racks which are to be hardened.

Figure 2 is a side elevation taken sectionally along the line 2—2 of Figure 1.

Figure 3 is an elevation looking at the front of the apparatus.

Figure 4 is a sectional detailed view taken on the line 4—4 of Figure 1.

Figure 5 is a detailed sectional view taken on the line 5—5 of Figure 2.

It has been determined that if an oxyacetylene flame be passed over an individual tooth of a rack, there is danger that the corners at the ends of the rack tooth will be burned or scorched; there is greater exposure of the metal at these surfaces and less mass; consequently, the metal is elevated to too high a temperature. However, we have discovered that if protective racks be placed at opposite sides of the rack which is to be hardened, and if the teeth of all three be aligned, then the two sidewise racks furnish protection against excessive heat, and the teeth of the central rack are unblemished. The sidewise racks may be used over and over again and, while these sidewise members may be damaged by the heat so as to be unfit for usage as racks, they serve as buffers to prevent damage to the central member.

In place of a single member protected by the buffer racks, a plurality may be arranged, with the teeth of them all in alignment, and, in this case, the buffer racks provide the protection for the teeth of the outer members of the central group, and each of the members of the central group provides protection for the teeth of the rack member next to it. In this manner, the teeth of five or ten racks can be hardened simultaneously if the teeth be aligned and a torch passed over them.

The apparatus disclosed in the drawings utilizes this determination; five racks to be hardened are placed alongside one another in a group, and this group is bounded at each side by the protective or buffer racks as they may be called. Thus, the protective strips are indicated generally at "a" in Figure 1, and the racks of the group therebetween at "b".

From the point of view of method, therefore, the invention contemplates the flame hardening of an individual tooth of a rack by placing buffer strips at the opposite ends of the tooth, then passing a torch capable of elevating the metal of the tooth to hardening temperature across the tooth and buffer strips with the buffer strips being pressed closely adjacent and preferably in pressure contact with the rack so that the metals at the corners of the rack tooth are kept at a temperature below that at which they would be scorched or burned.

The flame hardening machine which is illustrated in the drawings is comprised of a table upon which the assembly of racks and buffer strips may be supported. This table is indicated generally at 1, and it is comprised, most economically, of an inverted channel member which is sufficiently long to support the rack group throughout its entire length. The channel member is supported upon a bed 2, which preferably comprises a central trough portion 3, with the table being elevated above the trough and supported thereon by means of the legs 4; these may be provided at spaced intervals along the length of the table.

The trough, at each side is provided with rails 5, and a carriage assembly indicated generally at 6 is arranged to be movable along the rails longitudinally of the bed and table.

The carriage 6 is comprised of a cross member or cross feed table, indicated generally at 7, supported from legs 8—8, and truck members 9 are attached to the bottoms of the legs so as to carry rotatable wheels 10 for engagement with the side rails 5 of the bed of the apparatus. A pair of wheels is journalled in each truck member, one at each end thereof, and the wheels are grooved as at 11 to fit the rails and thereby guide the carriage. The legs elevate the cross member 7 above the rack assembly so that the carriage is free to travel longitudinally of the bed of the apparatus.

The cross feed carriage, indicated generally at 12, is arranged to travel on the cross member 7 back and forth across the bed, and the torch apparatus is supported from the cross feed carriage 12. Thus, by moving the carriage 6 longitudinally of the bed and the carriage 12 transversely of the bed, the torch, which is indicated generally at 13, may be moved at will over the table 1 or the racks supported by it.

The carriage 12, the torch 13, and the means for adjustably supporting the torch from the carriage do not form a part of the present invention, and the details concerning this portion of the apparatus are not, therefore, described in detail. In general, however, the carriage 12 is comprised of a base 14 having a pair of wheels 15 at each side thereof. These wheels are arranged to track upon rails 16 which are provided on the cross member 7; for instance, in the structure shown in the drawings, cross member 7 of the cross carriage is comprised of a channel having its flanges extending upwardly, while the legs 8 are fastened to the channel at each end thereof.

A post 17 is provided at the back part of the cross feed carriage, and this post carries the torch adjusting apparatus indicated generally at 18. An arm 19 extends from the adjusting apparatus to carry a torch column 20, and a distributing head 21 extends below the torch column to carry a pair of torch heads 22. By adjusting the handle 23, the torch may be adjusted longitudinally of the bed and by adjusting the handle 24, the torch heads may be raised and lowered. The knob 25 provides means for tilting the torch head in a plane of revolution parallel to the cross feed table 7.

The cross feed carriage 12 is driven by a motor 26 which is controlled through forward and reverse switches 27, a control clutch 28, and a speed controller 29, the latter being arranged for adjustment of the speed at which the motor drives the torch apparatus across the table. This portion of the equipment, as disclosed in the drawings, is known commercially as the Linde or Airco torch carriage, though other companies make similar equipment.

Oxygen and acetylene are fed to the distributing head 21 through the lines 30 and 31 respectively which are attached to the upper portion of the column 20. From the distributing head, the gases pass through the feed lines 32 and 33 respectively to the torch heads 22.

There are two heads or tips; each preferably is of the multiple jet type and the tips are arranged relative to one another so that the jets of flame impinge upon the opposite sides of a rack tooth being treated. The jets preferably are water-cooled, and the cooling system is described at a later point in the specification.

In each head or tip, the jets are arranged in tandem with the first jet acting to preheat the metal so that the temperature of it is elevated gradually by the following jets of flame. It is by this method that the heat is confined to the teeth of the rack so as to leave the base portion in a softened condition. It is preferable that the heads or tips be configurated to fit part way down into the groove between the teeth so that the jets of flame may strike the teeth approximately midway between the top of each tooth and its root. In this manner teeth of about four to ten pitch can be hadened most conveniently without affecting the rack base portion. It is difficult, excepting with teeth of small size, to obtain the desired elevation of temperature uniformly throughout the tooth by causing a flame to be impinged upon the top of the tooth, and it is also difficut to avoid burning of the metal, as well as to confine the heat, if a large single flame be used. The preferred torch tips are spaced away from the teeth sufficiently for the blue cone portion of the flame to be spaced slightly away from the metal surface. These features of the present invention concerning particularly the torch head or tip are described in more detail and claimed specifically in our copending application.

*Control valves*

Oxygen and acetylene are preferred for operation of the torch though other gases may be used. The gases are supplied to the hardening apparatus from conventional pressure cylinders (not shown) the supply lines from the cylinders being attached to the machine at 35 and 36 respectively, as indicated in Figure 1. These lines are led to a main gas control valve 34 comprising two valve units, one for the oxygen and one for the acetylene. The gases pass from the control valve 34 through the lines 30 and 31 to the inlets at the top of the torch column 20. The lines preferably are flexible and take-up loops are provided at the back part of the cross table to permit the torch to be moved transversely over the bed of the machine.

Control valve 34 is mounted on an angle bracket 37 at the forward end of the cross channel 7. The valve units which it contains are preferably of the reciprocating type, each being mounted in a housing 38 which is supported upon the bracket 37. An operating lever 39, having a handle 40, is pivotally journalled at the upper portion of the valve housing 38, and the lower face of the operating lever is arranged for engagement with the valve stems in such a manner that when the valve stems are depressed, the valves are closed. A tension spring 41 having one end attached to the valve lever and the other end attached to a stud 42 extending from the valve housing, is employed to urge the valve toward closed position.

At the side of the valve lever pivot opposite the tension spring, a cocking mechanism is provided to hold it in open position until it is released, for closure, by a dog extending from the cross feed carriage, and thereby shut off the supply of gas to the torch when the torch has traversed the assembly of racks carried on the table.

In the apparatus disclosed, a clevis arm 43 extends forwardly from the valve housing and pivotally carries a bell crank or trigger 44. The trigger has a latch arm 45 extending inwardly beyond the pivot, and a notch 46 is provided in this arm for engagement with a latch finger 47 extending downwardly from the lever member 39. A compression spring 48 is installed intermediate the latch arm 45 and the clevis support 43 so as to urge the arm 45 upwardly into engagement with the latch finger 47. The other portion of the bell crank, or trigger, extends downwardly into the path of travel of the dog member 49 which is fastened, as at 50, to the cross feed carriage 12; there being an aperture 51 in the angle bracket 37 through which the dog 49 is free to pass. As the carriage 12 moves from the back of the machine toward the front across the bed, the dog 49 comes into engagement with the trigger arm 44, swinging it outwardly away from the machine and simultaneously lowering the latch arm 45 against the spring 48. This motion releases the latch finger 47 from engagement with the notch 46 and permits the tension spring 41 to pull the lever 39 downwardly against the valve stems to shut off the passage of acetylene and oxygen through the feed lines 32 and 33. At this time, the torch is extinguished so that there is no wastage of gas while the feed carriage is being returned and the torch is being located for the heat treatment of the next successive tooth of the assembly of racks.

*Ignition of torch flame*

At the end of each heat treating course of travel, the torch is extinguished. Cross feed carriage 12 then may be returned across the bed, the longitudinal carriage 6 being moved to bring the torch into position for treatment of the next successive tooth. It is then necessary that the torch be relighted, and for this purpose, a pilot light is employed to accomplish the lighting of the torch automatically after the main control valve 34 has been opened by recocking of that valve through movement of the lever 39 by the handle 40.

The pilot light control apparatus is indicated generally at 52 and it comprises a reciprocating valve 53 and a pilot burner 54 which is connected with the valve through the line 55. Ordinarily, a small quantity of gas is by-passed around the valve 53 so as to maintain a small pilot flame at the burner head. Valve 53, however, has a stem 56 which, when depressed, opens the valve to permit gas to surge through the line 55 in order that the burner 54 may project a flame against the torch heads 22.

More specifically, a lever 57 is pivoted in bracket arms 58 extending from the body of the valve, as shown in Figure 5, with a portion of this lever, at the one side of the pivot, engaging the valve stem 56, and a portion at the other end positioned in the path of travel of an operation dog 59 which is mounted upon the cross feed carriage 12. When the carriage is moved to "starting" position, the dog 59 engages the lever 57, pushing it backwardly and thereby opening the pilot valve to cause the projection of a jet of flame against the torch heads. As soon as the cross carriage moves the control dog 59 away from the lever 57, the valve is operated to cut off the gas supply and thereafter only the pilot light burns.

For pilot lighting purposes, illuminating gas preferably is used and it is supplied to the pilot valve through the feed line 60; this feed line, as illustrated in the drawings, passes to a connection block 61. The pilot valve itself is supported upon the block 61 by a pipe stud for communication with the line 60 through the connection block 61.

Tooth aligning apparatus

The assembly of racks $b$ mounted on the table 1 and bounded by the buffer racks $a$ as previously described, are manipulated by hand so that their teeth generally are in alignment. However, in order that there be uniformity in the heat treatment of all of the teeth, it is desirable that they all be aligned very accurately, and, for this purpose, the aligning apparatus, indicated generally at 62, is utilized.

U-shaped clamp blocks 63—63 are fastened by means of bolts 64 to the downwardly extending flanges at each side of the table 1. Pairs of these blocks are placed at intervals along the table, for instance, each twelve to eighteen inches or thereabouts and U-shaped hanger members 65 are provided for each pair of blocks. The hangers have legs 66 extending downwardly and arranged to be inserted in the slots of the U-shaped clamp members, and bores are provided through the blocks and legs so that keeper pins 67 may be inserted to prevent the hangers from being lifted out of engagement with the blocks. The legs of the hangers are sufficiently long to permit the cross portions of the hangers to reside substantially above the rack assemblies and yet be cleared by the cross table 7.

A clamp bar 68 is arranged beneath the cross portion of each hanger 65, with a pair of studs 69, headed as at 70, extending upwardly from the clamp bar 68 through bores in the cross member of the hanger. The clamp bar 68 is counterbored appropriately to receive compression springs 71 between the clamp bar and the stud heads so that the springs 71 tend to lift the clamp bar 68 upwardly. Two of these lift studs are used, as shown in Figure 2.

At spaced intervals along the hanger 65, compression screws 72 are located to press the clamp bar downwardly. For accurate aligning of the teeth which are generally aligned by hand, cross rods 73 are laid in the tooth grooves. The hanger 65 is then inserted in the slots of the blocks 63, the keeper pins 67 are installed, and the compression screws 72 are turned to press the clamp bar downwardly upon the aligning rods. This operation wedges the rods into the tooth grooves and brings all of the teeth into exact alignment.

The blocks 63 extend somewhat above the level of the table 1 and carry clamp screws 74 at one or at both sides of the table; by turning these screws the racks can be pressed firmly one against the other. Take-up blocks 75 may be employed between the clamp screws 74 and the rack assembly if the group of racks does not extend across the entire width of the table.

Quenching and cooling

The hardening of the teeth is accomplished by elevating the temperature of the metal to a suitable degree, then cooling the metal quickly by means of water or other cooling agent. The coolant is supplied to the machine through two lines. One of these, indicated at 76, passes through the connection block 61 and along the cross table to a distributing block 77. From the block 77 the coolant is distributed through the lines 78, 79, and 80; a valve 82 being installed in each line to control the flow of coolant. These lines 78, 79 and 80 are set relative to the teeth so that with the torch playing a flame upon a given one of the teeth, two of the lines provide coolant to the preceding tooth; that is, the one just hardened by the torch to prevent drawing of the hardened tooth, and the other to the opposite side of the tooth next to be hardened. The coolant flows in the tooth grooves and emerges at the opposite side of the rack assembly thereafter being free to drain into the trough at the bed of the machine.

The second coolant line, indicated at 83, is attached to the distributing head 21 at the lower end of the torch column 20. The coolant is distributed from this point through two pairs of lines. One pair indicated at 84 emerges from the back of the distributing head 21 and passes under the block and forwardly to the torch burner heads or tips 22. The lines 84 comprise the main support for the burner tips and should therefore be substantially rigid. The coolant circulates through the tips and is exhausted through a pair of elbow pipes 85 which direct the coolant out over the racks to the sides of the burner tips. The other pair of coolant lines, indicated at 86, emerges from the top of the distributing head and extends forwardly and curves together downwardly to direct quenching streams of coolant onto the tooth just after it has been heated to a hardening temperature. The quenching streams may be derived from the exhaust of the cooling stream for the burner tips by providing appropriate lines.

Indexing mechanism

The mechanism, indicated generally at 87, is employed as an index for serially locating the torch heads with respect to the succession of rack teeth, and also as a means for holding the carriage against movement longitudinally of the bed during the treatment of a tooth. This indexing mechanism is fastened to a bracket 88 extending from the side of the cross table 7, preferably at the side opposite the torch. A plate 89 is fastened to the bracket 88 and comprises a pair of pillow blocks 90 which are bored to receive a vertical shaft 91. A collar 92 is pinned to the shaft 91 intermediate the pair of blocks, and a compression spring 93, operating against one of the pillow blocks and the collar, urges the shaft in a downward direction. The bottom of the shaft is arranged to carry a rack segment 94, and the teeth of this are of the same pitch as those of the rack so the teeth of the segment mesh with the teeth of a rack of the type being treated. The rack segment preferably is removable in order that segments of different size can be attached to the shaft depending upon the pitch of the racks being treated.

At its upper end, the shaft 91 is provided with a lift pin 95 and a lever 96, pivotally mounted upon the plate 89, is provided with a fork 97 for engagement around the shaft beneath the lift pin 95. It will be seen that as the operating lever 96 is depressed, as shown in the dot-dash lines in Figure 4, the shaft is lifted to withdraw the teeth of the rack segment from the teeth of a given one of the racks of the assembly, thereby permitting the carriage 6 to be moved longitudinally of the bed of the apparatus and along the racks on the table.

As shown in the drawings, and particularly Figure 1, the indexing mechanism may be arranged to cooperate with a separate indexing rack 98 which is supported along the side of the bed in position parallel with the main rack assembly. This arrangement is desirable because the indexing rack can be isolated from the main group of racks undergoing treatment, and therefore can be kept clean for accurate indexing purposes. Referring to Figure 1, the bed of the apparatus may be provided with a table extending from the main trough portion located beneath the rack table 1. A wall flange 99 may be arranged along the rack table so as to prevent any coolant from spilling over on the indexing rack. With the indexing segment of the carriage being meshed with a rack below it so as to hold the carriage in stationary position, the torch head may be adjusted so that the tips are disposed properly with respect to a given tooth of a rack to be treated, thereafter it is necessary only to lift the indexing segment out of meshing engagement with the rack below it and move the carriage to the next successive indexing station for alignment of the torch head with the next tooth. In place of the arrangement disclosed, the indexing mechanism may be located above the main rack table 1 so that the rack which is undergoing treatment also serves as its own index. In this case, it is desirable to have a short piece of rack extend beyond the main assembly at the beginning of the treatment so as to compensate for the distance between the indexing mechanism and the torch head.

*Mode of operation*

The cross feed carriage is preferably arranged to be driven at a uniform rate of speed by the motor 26 from the back of the apparatus toward the front; that is, toward the control valve 34. With the racks appropriately aligned and clamped upon the table, and the pilot light ignited, the valve 34 may be cocked to light the torch. At this time, with the coolant being supplied, as previously described, the cross feed carriage motor is turned on to move the torch along a rack tooth for the hardening operation. When the torch reaches the forward end of the tooth, valve 34 is cut off by engagement of the control dog 49 with the trigger 44 so as to turn off the torch. The motor may then be declutched and the carriage returned to starting position. As best illustrated in Figure 5, a positive stop member 100 may be provided at the terminus of the return run of the carriage 12. The stop member may be fixed to the rear of the cross channel 7, and extend upwardly into the path of travel of a dog 101 mounted upon the carriage 12. The carriage is then indexed longitudinally to align the torch with the next successive tooth to be hardened and the cycle of operations repeated.

The carriage preferably always is operated between two rack clamps and as the hardening of teeth one after another progresses and the torch is near one of the hangers 65, it may be removed and inserted in the next successive pair of hanger blocks 63 down the bed of the machine while the next succeeding clamp may be moved up to the blocks just behind the carriage.

The clamping of the racks side by side is employed for the purpose of bringing the racks into metal to metal contact so that there will be good dissipation of heat from one to the other for best cooling purposes. It is in this manner that the scorching and the burning of the sharp edges of the teeth are avoided through the prevention of excessive temperatures at the portions which are most exposed to the torch flame. On the other hand, the pressure clamps hold the racks firmly upon the table so that the teeth of all are at a given elevation with respect to the torch flame to provide for uniformity of hardness from tooth to tooth.

This application is divisional of our application Serial No. 393,594, filed May 15, 1941 for "Flame hardening of rack bars."

Having described the principles of the present invention and the preferred embodiments of it, we desire to be limited only by the claims which follow:

1. Apparatus for flame hardening the teeth of racks and the like which comprises a bed having a table for supporting a rack thereon, a carriage which is movable longitudinally of the table, means including a torch which is movable upon said carriage transversely of the table, motor apparatus for driving said means across the table, means for feeding gas to said torch including a valve located on said carriage, a dog which is operated in conjunction with said torch supporting means for closing said valve when the torch has been driven across the table, and means for relighting said torch comprising a pilot light, a valve adapted to admit a rush of gas therethrough when the valve is operated, with the pilot being arranged to ignite said rush of gas and thereby direct a jet of flame toward said torch, and means carried by said torch supporting means for opening said valve when the torch is moved to the opposite side of the table.

2. Apparatus for flame hardening the teeth of racks and the like which comprises a table, a carriage movable longitudinally of the table, means including a torch carried by the carriage and arranged to be moved transversely of the table, means for supplying combustible gas to the torch, valve means for cutting off the supply of gas when the torch has been moved to one side of the table, and means including a pilot light and a dog actuated by movement of said carriage for opening said valve means, the pilot light being arranged for relighting the torch when the torch has been moved to the other side of the table, and the dog actuates said valve means to admit the supply of gas to said torch.

3. Apparatus for flame hardening the teeth of racks and the like which comprises a table adapted to support a rack thereon, a carriage movable longitudinally of the rack and table, a torch supported by said carriage, means for moving the torch transversely of the table whereby a flame provided by the torch may pass along the teeth of racks supported on the table, a hanger extending transversely across the table and clamp means carried by said hanger for clamping the racks downwardly upon the table, said clamp means including a rod-like element adapted to be fitted into the tooth grooves of a plurality of racks arranged upon the table whereby the teeth of them may be aligned and the clamp means being arranged to press the rod into said tooth grooves.

4. Apparatus for hardening the teeth of racks and the like which comprises a bed for supporting a plurality of racks thereon, a carriage movable longitudinally of the bed, a torch supported by the carriage, means for moving the torch across the carriage and transversely of the bed, means for clamping a plurality of racks located on the bed, one against the other, an aligning member and means for pressing said aligning member into the tooth grooves of racks located on the bed for aligning the teeth of the racks before they are clamped against one another and also for holding the racks under pressure against said bed.

5. Apparatus for flame hardening the teeth of racks and the like which comprises a table, a carriage movable longitudinally of the table, a torch movable across the carriage, with the said torch being arranged to provide a jet of flame capable of heating the metal of the teeth of racks located on the table to hardening temperature as the torch is moved transversely of the table, a plurality of clamping means arranged at spaced intervals longitudinally of the table for clamping racks located on the table against one another, and means extending transversely across the table for pressing the aligned racks against the table.

6. Apparatus for flame hardening the teeth of racks and the like comprising a table, a carriage movable longitudinally of the table, a torch movable across the table, with said torch being arranged to provide a jet of flame capable of heating the metal of the teeth of racks located on the table to hardening temperature as the torch is moved transversely, and means supported from the table and extending transversely across it at opposite sides of said torch, said means including clamp screws for pressing racks located on said table into clamped engagement therewith.

7. Apparatus for flame hardening the teeth of racks and the like comprising a table, a carriage movable longitudinally of the table, a torch movable across the table, with said torch being arranged to provide a jet of flame capable of heating the metal of the teeth of racks located on the table to hardening temperature as the torch is moved transversely, clamp means extending transversely across the table at spaced intervals longitudinally thereof for pressing racks against the table and additional clamp means for pressing a plurality of racks arranged upon the table in side by side relationship against one another.

8. Apparatus for flame hardening the teeth of racks and the like comprising a table, a carriage movable longitudinally of the table, a torch movable across the table, with said torch being arranged to provide a jet of flame capable of heating the metal of the teeth of racks located on the table to hardening temperature as the torch is moved transversely, means for aligning the teeth of a plurality of racks arranged upon said table, and buffer racks having teeth of substantially the same configuration as the teeth of racks to be treated, the said buffer racks being adapted to be located at opposite sides of a plurality of racks arranged in side by side relationship whereby the teeth of the buffer racks constitute the terminals of each line of teeth and prevent the edges of the teeth of the racks being treated from being burned.

ALFRED KULLMAN.
THOMAS A. WALTZ.